Sept. 22, 1953     R. T. CORNELIUS     2,653,005
VALVE

Original Filed Dec. 2, 1949     2 Sheets-Sheet 1

Inventor
RICHARD T. CORNELIUS
By Caswell & Lagaard
ATTORNEYS

Sept. 22, 1953 R. T. CORNELIUS 2,653,005
VALVE
Original Filed Dec. 2, 1949 2 Sheets-Sheet 2

Inventor
RICHARD T. CORNELIUS

By Caswell & Lagaard

ATTORNEYS

Patented Sept. 22, 1953

2,653,005

UNITED STATES PATENT OFFICE 2,653,005

VALVE

Richard T. Cornelius, Minneapolis, Minn.

Original application December 2, 1949, Serial No. 130,727. Divided and this application February 6, 1950, Serial No. 142,658

2 Claims. (Cl. 251—122)

This application is a division of my application for patent for Diaphragm Pump Serial No. 130,727, filed December 2, 1949.

The herein disclosed invention relates to self closing valves and has for an object to provide a valve in which the cross sectional area of the opening in the valve is relatively great with a minimum relative movement of the parts.

Another object of the invention resides in providing a valve in which positive closure may be effected to prevent leakage.

A still further object of the invention resides in providing a valve in which the moving parts are of rubber or some other similar suitable flexible material.

An object of the invention resides in providing a valve suitable for use in a water pump and in which hammering and other noises caused by the interruption of the flow of the water pumped is greatly reduced.

Another object of the invention resides in providing a valve which will readily pass sand without injury to the valve or rendering the same inoperative.

A further object of the invention resides in providing a valve in which the resistance to reverse flow of liquid through the valve increases with the increase of pressure about the valve.

Another object of the invention resides in providing a valve which is rapid in operation and in which a small effort is required to operate the valve.

A still further object of the invention resides in providing a valve in which the two cooperating valve members are both flexible.

An object of the invention resides in providing a valve in which the discharge occurs in a number of opposite directions normal to the direction of flow of the liquid entering the valve.

A still further object of the invention resides in providing a valve circular in form and having an annular discharge opening through which the discharge may occur radially in various opposed directions about the entire extent of the opening.

Another object of the invention resides in constructing the valve with two dish shaped valve members arranged in facing relation and having flexible rims adapted to cooperate with one another to permit of passage of liquid from the space within said members and exteriorly from between said rims and to exclude reverse travel of the liquid.

A still further object of the invention resides in providing a perforate sleeve separating said valve members and into which the liquid is directed, said sleeve having radial openings through which the liquid passes upon escaping from the valve.

Another object of the invention resides in providing dish shaped supports within the valve engaging the sleeve and the valve members and preventing collapse of the valve members when the pressure about the valve reaches a relatively high value.

Other objects of the invention reside in the novel combination and arrangement of parts and in the details of construction hereinafter illustrated and/or described.

For the purpose of illustration a diaphragm pump has been shown suitable for use in pumping water. This pump has a pump body providing a pressure chamber and with which is associated a piston operating a diaphragm adapted to create pressure within the pressure chamber. Mounted in a wall defining said chamber are two valves embodying the invention claimed herein, one of these valves being an inlet valve and the other an outlet valve. Both of these valves are of the self-closing type and are identical in construction. These valves each consist of two dish shaped flexible valve members arranged in facing relation and having rims yieldably contacting each other about the periphery thereof. Within the space between these valve members is disposed a sleeve having radially disposed openings through which liquid entering the sleeve may pass in leaving the valve. Two dish shaped supports are situated at the ends of the sleeve and support the valve members to prevent collapse thereof. One of these supports has a central opening therein communicating with the passageway within said sleeve and adapted to register with an opening in the wall on which the valve is mounted. A bolt extends through a washer overlying the other support and through the opening in said first named support and said wall, urging the support with the opening and the overlying valve member toward said wall to form a fluid-tight connection therewith. Said bolt further engages a crowfoot on the opposite side of said wall and by means of which the parts are held mounted on said wall. This crowfoot straddles the opening in said wall and permits of the liquid passing through said opening.

Figure 1:
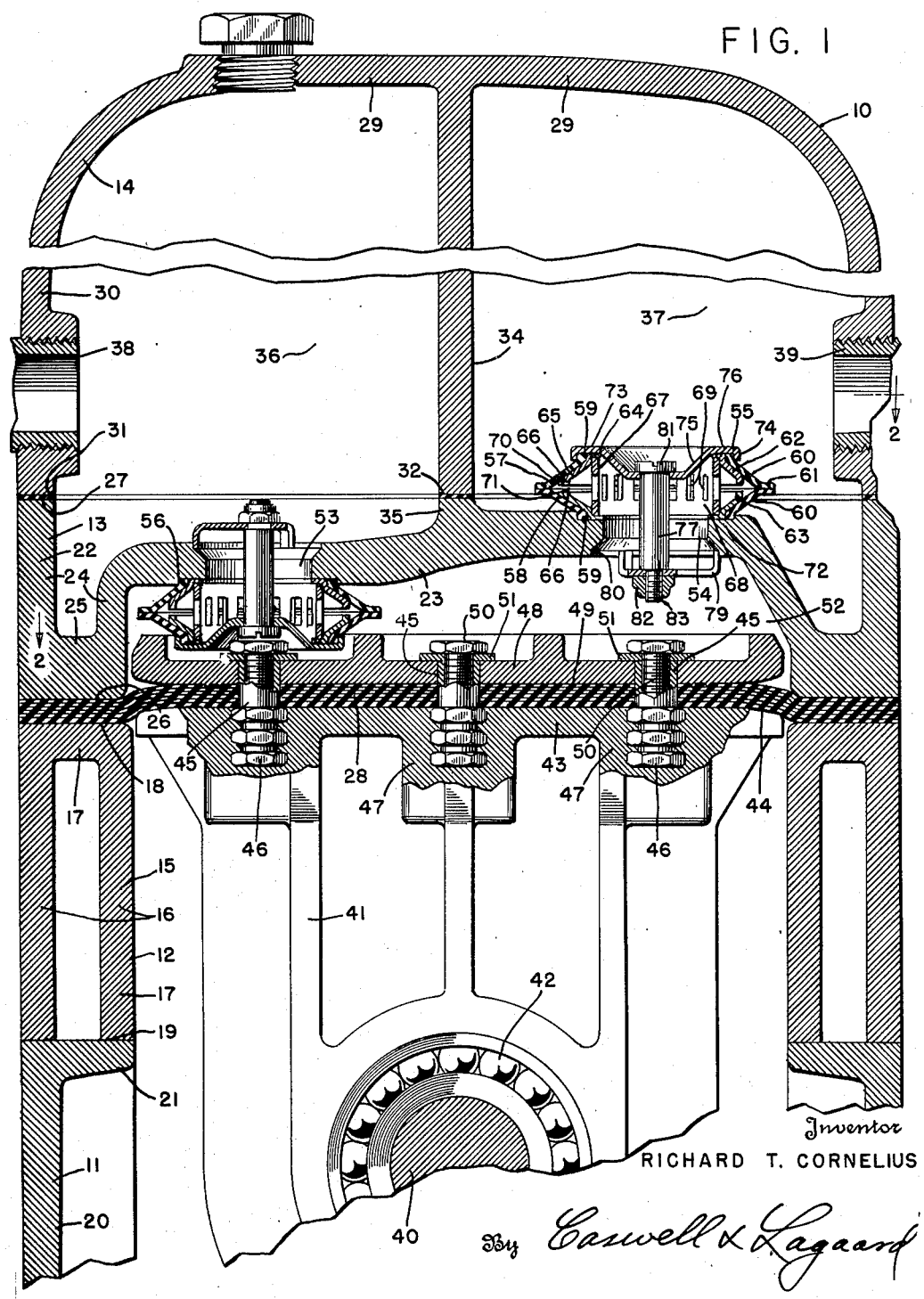
Fig. 1 is an elevational sectional view of part of a pump illustrating an embodiment of the invention applied thereto and taken substantially on line 1—1 of Fig. 2.
Figure 2:
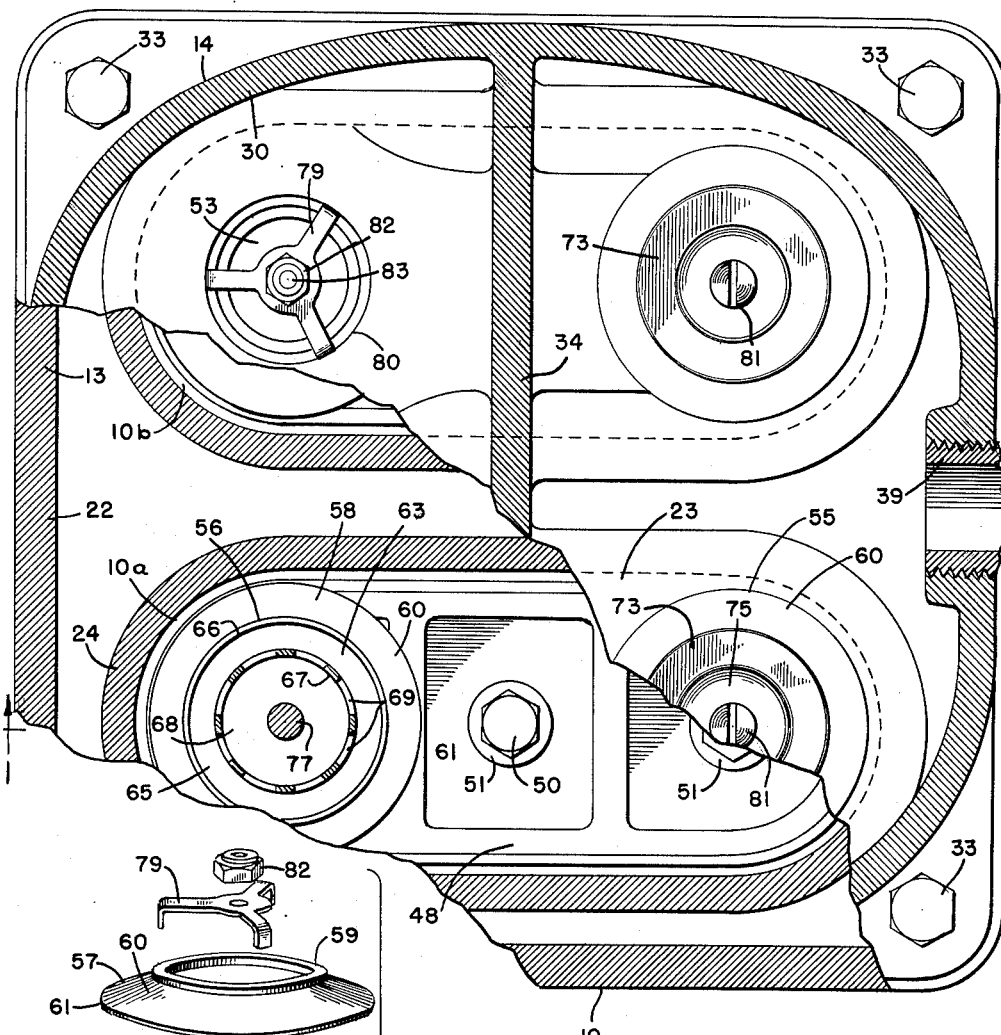
Fig. 2 is a plan sectional view of the pump taken substantially on line 2—2 of Fig. 1.
Figure 3:
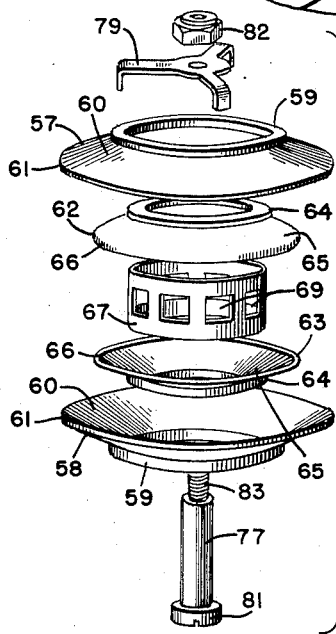
Fig. 3 is a perspective view of the valve apart from the pump and with the parts of the valve separated from one another.

The pump illustrated in the drawings is of the diaphragm type and is indicated by the reference numeral 10. This pump consists of a base 11, a body 12 resting upon said base, a head 13 overlying said body and a cap 14 mounted on top of the head 13. The pump 10 includes two pump units 10a and 10b which operate together to produce more uniform pressure. Both of these pump units being similar in construction only the pump unit 10a will be described in detail.

The body 12 is generally rectangular in form having vertically extending walls 15. These walls are constructed with spaced sections 16 connected together by webs 17 whereby surfaces 18 and 19 of extended width are formed at the upper and lower portions of each of the walls 15 and extending completely about said body.

The base 11 has vertical walls 20 which are formed with flanges 21 on which the surface 19 of the body 12 rests. This base may be supported by any suitable construction which, not forming any particular feature of the invention, has not been shown in the drawings.

The head 13 consists of vertical walls 22 which lie in continuation of the walls 15 of the body 12. The said head further has a horizontal wall 23 spaced above the lowermost portions of the walls 22 and connected thereto by means of perimetrically arranged walls 24 and webs 25. By means of this construction a surface 26 is formed at the lower portion of the head 13 which is of the same width and shape as the surface 18 of body 12 and which overlies said surface. The upper end of the head 13 has a surface 27 formed on the walls 22 which is parallel to the surface 26 and lies in a single plane.

Disposed between the surfaces 18 and 26 of the body 12 and head 13 is a diaphragm 28 of some flexible material such as rubber fabric or the like. This diaphragm is clamped in position between said surfaces in a manner to be presently described in detail.

Overlying the head 13 is the cap 14. This cap is dome shaped in form having a top 29 and vertical walls 30 connected thereto. The cap 14 is formed at the lower ends of the walls 30 with a surface 31 which overlies the surface 27 of head 13. Between these surfaces is disposed a gasket 32 which forms a tight connection between the head and cap. A number of cap screws 33 extend through the cap 14, the head 13 and body 12 and are screwed into the base 11. These screws hold the parts assembled and also serve to clamp the diaphragm 28 rigidly in place between the two surfaces 18 and 26 of the body 12 and head 13. In the cap 14 is formed a partition 34 which meets a partition 35 on the wall 23 of head 13 and divides the space above said head into two chambers 36 and 37. The chamber 36 serves as an inlet chamber to the pump which communicates through a pipe 38 with the source of fluid to be pumped. The chamber 37 serves as a discharge chamber for the pump and communicates through a pipe 39 with the system into which the fluid is pumped.

The base 11 supports a crank shaft 40. This crank shaft is rotatably mounted in bearings carried by the base 11 but not illustrated. Mounted on and operated by this crank shaft is a connecting rod 41 forming part of the pump unit 10a. This connecting rod has mounted in it a ball bearing 42 which is carried by the crank shaft 40. This connecting rod has formed integral with it a piston 43 which has a surface 44 which engages the diaphragm 28. Issuing from this piston are three studs 45. These studs are formed with heads 46 which are imbedded in bosses 47 formed on the piston 43. Overlying the piston 43 is a follower 48 which has a surface 49 overlying the diaphragm 28. The studs 45 pass through the diaphragm 28 and through the follower 48. For clamping the piston diaphragm and follower together screws 50 are employed which are screwed into the studs 45. Washers 51 encircle these screws and bear against the follower 48. In the head 13 and between the walls 23 and 24 thereof and the diaphragm 28 is formed a chamber 52 which serves as the pressure chamber of the pump.

The wall 23 of the head 13 is formed with openings 53 and 54 which serve as ports bringing the chamber 52 into communication with the chambers 36 and 37. Associated with these two ports are two valves 55 and 56 utilizing the instant invention. The valve 55 is an outlet valve while the valve 56 is an inlet valve. Valve 55 is disposed in chamber 37 while valve 56 is disposed in chamber 52. These valves are identical in construction and only the valve 55 will be described in detail.

The valve 55 comprises two valve members 57 and 58 which are constructed of rubber, neoprene or some other suitable flexible material. These valve members are constructed as discs, dish shaped in form which have annular centers 59 with conical flanges 60 flaring outwardly therefrom. The extreme outermost portions of these flanges terminate in annular rims 61. The members 57 and 58 are arranged facing one another with the rims 61 in engagement and the same are slightly squeezed together to procure firm contact between said rims. The members 57 and 58 are backed up by two dish shaped supports 62 and 63 which are similar in shape to said valve members. These supports have annular centers 64 with conical flanges 65 flaring outwardly therefrom and terminate in inwardly turned rims 66. Between the centers 64 of the supports 62 and 63 is a sleeve 67 which serves as a spacer to hold the said support in proper relation and to maintain an annular passageway 71 between the rims 66 of the supports 62 and 63. This sleeve has a longitudinal passageway 68 in the same and is formed in a circle about the same with a number of openings 69 which bring the passageway 68 into communication with a valve chamber 70 formed between the two valve members 57 and 58.

The valve 55 is supported in the following manner: In the upper surface of the wall 23 of head 13 and encircling the opening 54 is an annular recess 72. This recess receives the center 59 of member 58 as well as the center 64 of support 63. A washer 73 overlies the member 57 and the support 62 and closes the opening through the said member and support. This washer has a downturned lip 74 at its outer edge and a depressed center 75 which forms in the underside of said washer an annular groove 76 in which the centers 59 and 64 of the member 57 and support 62 are received. A bolt 77 extends through this washer and below the wall 23 and also through a crowfoot 79 received in an annular recess 80 formed in the underside of the wall 23 and encircling the opening 54 in said wall. The head 81 of this bolt is received in the depression formed in the center 75 while a nut 82 screwed on the threaded end 83 of bolt 77 clamps the parts together.

The operation of the invention is obvious. When pressure is created in chamber 52 the water or other fluid being pumped passes between the legs of the crowfoot 79 through the opening 54 in wall 23 which forms a longitudinal passageway leading into the passageway 68 in the sleeve 67. From here the water travels radially outwardly through the openings 69 and into the space between the supports 62 and 63. The water then passes radially outwardly through the passageway 71 and into the valve chamber 70. The valve members 57 and 58 being flexible are spread apart by the pressure of the water and form a slit between the two rims 61 of said valve members through which the water escapes into the chamber 37. The width of the passageway 71 determines the size of the slit formed between the rims 61 of said valve members, the amount of movement required to open said valve members and the resistance produced by the valve in the flow of the water through the same. As soon as the pressure in the chamber 52 reverses the pressure in chamber 37 forces the two lips 61 together to close the slit formerly formed therebetween and excludes movement of the water in the opposite direction. Valve 56 operates in the same manner as valve 55. By being arranged in inverted relation with reference thereto causes flow from the chamber 36 and into the pressure chamber 52. It will hence readily be comprehended that the pump operates in the conventional manner to draw liquid through the inlet pipe 38 into the chamber 36 and into the pressure chamber 52. From this chamber the liquid is discharged into the chamber 37 from which it leaves the pump through the outlet pipe 39 as described.

The advantages of the invention are manifest. The invention is extremely simple in construction and can be manufactured at a nominal expense. The parts are stampings and screw machine products and the valve members may be molded from rubber, neoprene or similar flexible material and can all be constructed by equipment now readily available for the purpose. By the use of the flexible valve members, sand or other foreign material present in the liquid being pumped passes readily through the valve without injuring or impairing the operation of the valve. By utilizing an annular slit as the discharge passageway from the valve at right angles to the passageway leading into the valve, the rate of flow is extremely low at any locality of the slit and water hammer and other noises frequently present with valves is entirely eliminated. By the use of two flexible discs contacting one another wear is extremely small and a valve constructed in accordance with the invention will operate almost indefinitely. Due to the annular slit through which the water or other liquid escapes being relatively large, movement of the flexible valve members is slight and fatigue and other injury to the valve members caused by operation thereof is almost entirely eliminated.

Changes in the specific form of the invention, as herein described, may be made within the scope of what is claimed without departing from the spirit of the invention.

Having described the invention, what is claimed as new and desired to be protected by Letters Patent is:

1. In combination with a wall having an opening therein and a recess therein encircling said opening, a valve including two dish shaped flexible valve members arranged in facing relation to form a chamber therebetween, each of said valve members having an annular center, a conical portion flaring outwardly therefrom and contacting rims at the edges of said conical portions, the center of one of said valve members being received in said recess, two dish shaped annular supports received within said valve members, said supports having annular centers disposed in the planes of the centers of said valve members, conical portions following along the conical portions of the valve members and rims extending toward one another, said rims falling short of the rims of said valve members, the annular center of one of said supports being received in said recess, a sleeve spacing said supports and forming an annular passageway between the rims of said supports communicating with said valve chamber, said sleeve having radially extending openings therein, a washer overlying the center of the other valve member and sleeve, a crowfoot engaging said wall on the opposite side thereof from said recess and a bolt extending through said washer and crowfoot.

2. In combination with a wall having an opening therein, a valve overlying said opening and disposed on one side of said wall, said valve including two dish shaped flexible valve members arranged in facing relation to form a chamber therebetween, two dish shaped circular supports lying adjacent said valve members and forming supports therefor, a sleeve disposed between said supports and holding the same in spaced relation with the rims of the flexible members in contact, the valve member adjacent said wall and the juxtaposed support each having an opening therein registering with and communicating with said opening in the wall, and forming a passageway extending into the valve, said sleeve having radially formed openings therein for bringing said passageway into communication with said chamber, a separate bridging member extending across the opening in said wall at one side thereof and engaging said wall, a washer extending across the flexible member furthest from said wall at the other side thereof, and a bolt extending through said washer, flexible valve members, supports, sleeve and bridging member and clamping all of said parts together.

RICHARD T. CORNELIUS.

References Cited in the file of this patent
UNITED STATES PATENTS

| Number | Name | Date |
|---|---|---|
| 127,038 | Field | May 21, 1872 |
| 890,121 | Brenner | June 9, 1908 |
| 1,027,587 | Hoffmann | May 28, 1912 |